Patented July 10, 1951

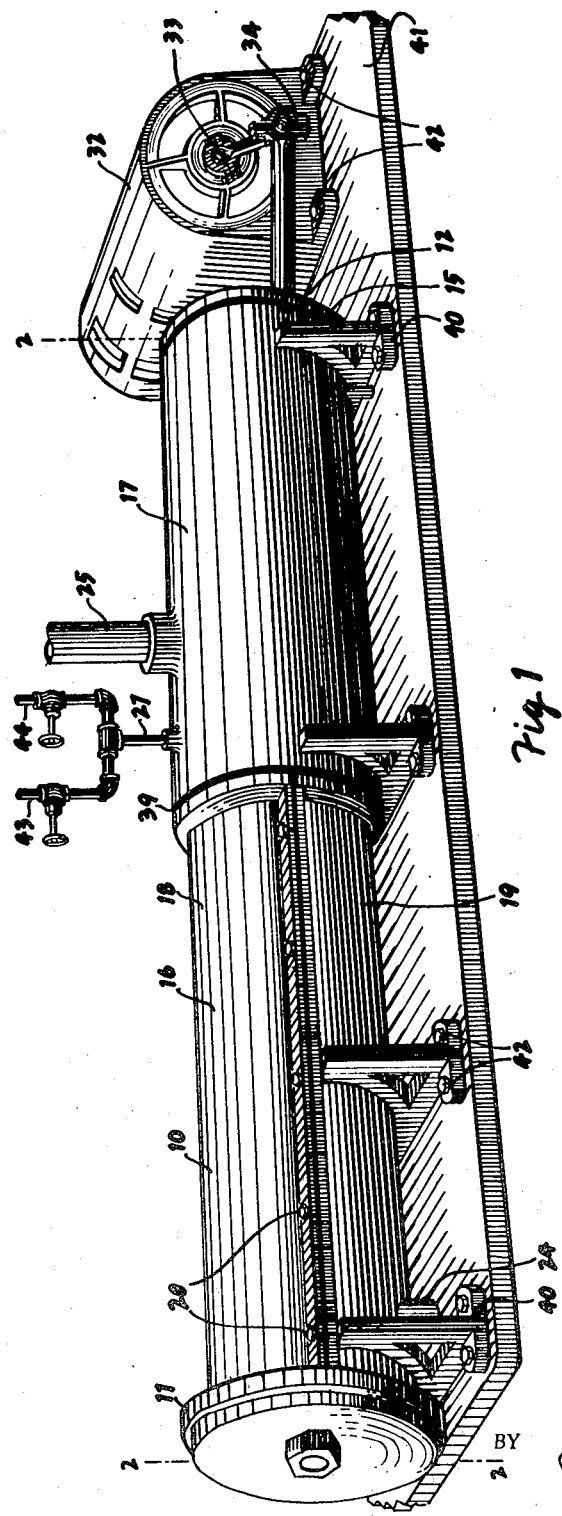

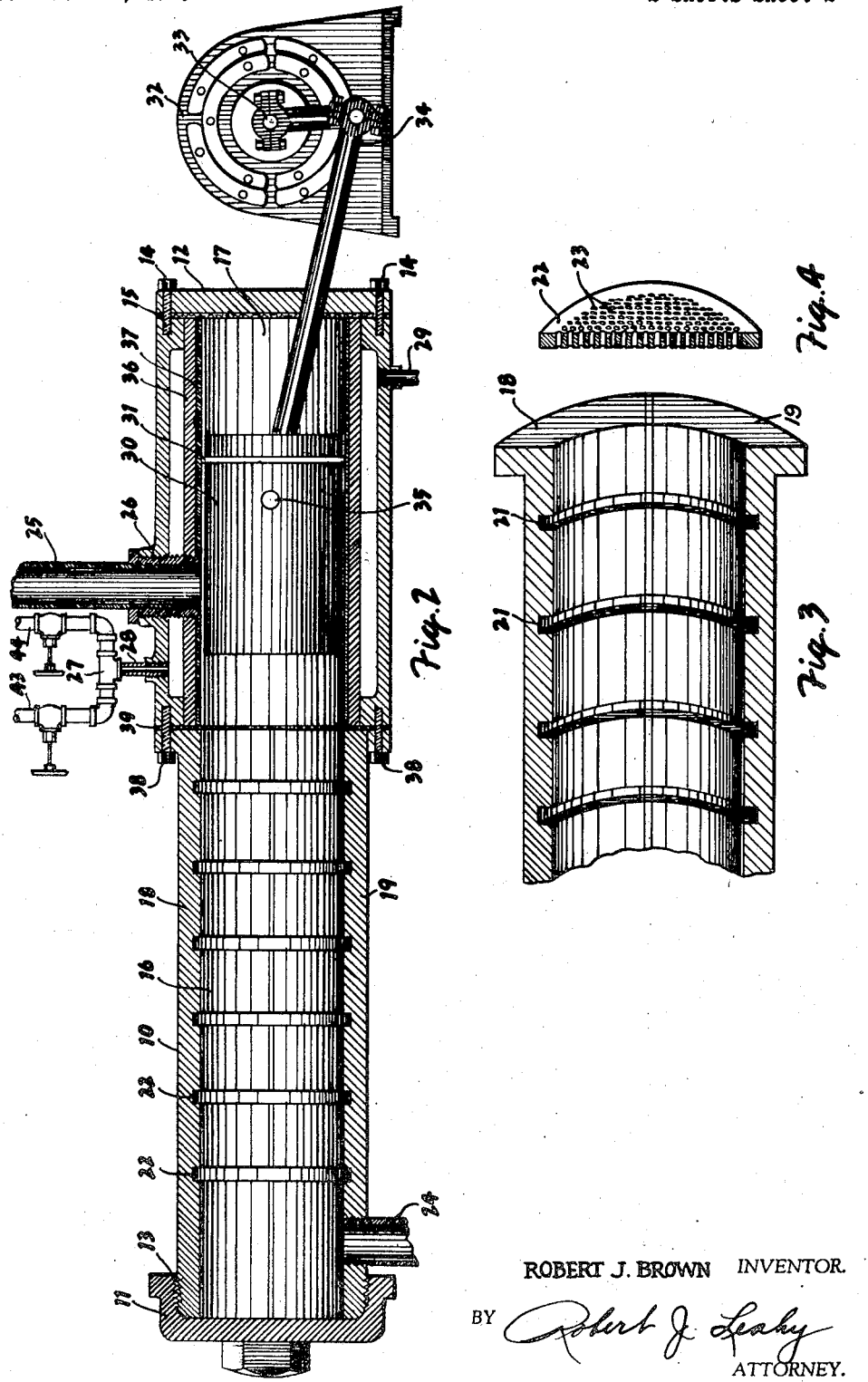

2,560,082

UNITED STATES PATENT OFFICE 2,560,082

METHOD AND APPARATUS FOR DISPERSING PIGMENTS

Robert J. Brown, Racine, Wis., assignor to S. C. Johnson & Son, Inc., Racine, Wis.

Application December 4, 1946, Serial No. 714,003

3 Claims. (Cl. 259—4)

This invention relates to a method and apparatus for dispersing pigments. More particularly, it relates to an improved method of dispersing pigments in the manufacture of paints, and to novel apparatus for carrying out this method.

Heretofore, there have been various methods and apparatus for "grinding" or dispersing pigments in the manufacture of paints. While in the case of certain earth pigments or inerts, the agglomerations of fundamental pigment particles are broken up during the "grinding" operation, ordinarily in the case of most chemical colors, the unit pigment particles are already fine enough when prepared, but because of later agglomeration of tiny particles together, it is still necessary to "grind" the pigment to rub apart these clusters.

While Buhrstone mills, roller mills, pebble and steel ball mills, Bramley mills and Banbury mills are all well known in the art for carrying out the grinding or dispersing operation, they are all subject to the common disadvantage of their limited production due to the length of time necessary to accomplish the dispersing operation.

It is therefore a primary object of my invention to provide an improved method and apparatus for dispersing pigments wherein a mixture of vehicle and pigment may be flowed through an opening small enough to effect a dispersing action on the pigment.

Another object of this invention is to provide an apparatus for carrying out my method wherein a closed mixing vessel is provided with a foraminous barrier and means for propelling a charge of material from the charge inlet through the foraminous barrier to the charge outlet.

Another object of my invention is to provide a pressure wetting apparatus wherein a mixture of pigment and vehicle is propelled or forced through a series of foraminous plates by means of a piston operated at a controlled rate.

Another object of my invention is to provide an efficient apparatus for dispersing pigment in the manufacture of paint which can be manufactured economically.

A further object is generally to greatly speed up the time required in dispersing pigment in the manufacture of paint. Still other objects will be apparent from the specification.

Now, in accordance with my invention, a method has been developed for dispersing pigment in the manufacture of paints comprising flowing a mixture of vehicle and pigment through a plurality of openings small enough to effect a dispersing action on the pigments.

The invention, both as to its organization and method of operation, together with further objects and advantages thereof, will best be understood by reference to the following specification taken in connection with the accompanying drawings which are an illustration of apparatus suitable for carrying out the process of the present invention.

The same reference characters have been used for the designation of like parts throughout and in the drawings.

Fig. 1 is a perspective view of the apparatus for dispersing pigment.

Fig. 2 is a cross-sectional view of Fig. 1 taken along line 2—2, with the piston shown in full to show the piston ring in position, the foraminous barriers and reduction gear box assembly shown in full.

Fig. 3 is a broken away, cross-sectional view in perspective showing the grooves or recesses in the vessel wall to receive the foraminous barriers.

Fig. 4 is a broken away, cross-sectional view in perspective showing the foraminous barrier.

Discussing now in detail the novel combination which makes up the pigment dispersing apparatus, there is a closed vessel 10, preferably an elongated steel cylinder. One end of the vessel 10 is provided with an end cap 11, and the other end with an end ring plate 12 which serve to seal the vessel and prevent leakage. The end cap 11 is affixed by means of a threaded screw 13, and the end ring plate 12 by means of a plurality of tap screws 14. A gasket 15 is positioned between the end ring plate 12 and the vessel wall 10 to prevent leakage.

The vessel 10 consists of a barrier section 16 and a temperature control section 17. The barrier section 16 consists of a top section 18 and a bottom section 19 firmly affixed when in operating position by means of a plurality of tap screws 20. The walls of these sections contain a plurality of grooves or recesses 21 corresponding to the number of foraminous barriers 22 to be inserted. These grooves 21 are of sufficient width and depth to receive and hold securely the foraminous barriers 22 when the top section 18 and bottom section 19 are in operating position. However, when the top section 19 is removed, the foraminous barriers 22 can be easily lifted out of these grooves 21 and removed for cleaning or replacement. The foraminous barriers 22, as shown in detail in Fig. 4 consist of a steel plate which has been drilled with a plurality of openings 23 adapted to allow passage of the charge through the barrier. These openings 23 will vary somewhat in size according to the particular pigment to be dispersed, and the amount of pressure applied. Preferably the openings in each individual barrier 22 should be of the same size, and will ordinarily decrease in size in the different barriers in the direction of flow of the charge. In the apparatus illustrated in Fig. 2, the plates are preferably 1 inch in thickness, and the openings in the barrier 22 nearest the piston 30 are about $3/32$ inch in diameter, and decrease in size in the other barriers 22 so that the openings in the last barrier 22 nearest the charge outlet pipe 24 is about $1/64$ inch in diameter. If desired, the holes may be countersunk (not shown) on the side the charge enters.

It is to be understood that the size of the openings may be varied as desired for the particular dispersing operation to be performed. Furthermore, if desired, the barriers 22 may have the same size openings 23, in one machine, but a plurality of barriers may be used, wherein the size of thef openings 23 are varied.

While Fig. 4 illustrates the preferred type of barrier 22, it will be readily apparent that other type barriers, such as screens, etc. may be used. However, the steel plate type of barrier 22 is preferred because of strength, durability, etc.

The barrier section 16 is provided with a charge outlet pipe 24 from which the charge may be withdrawn after it has been flowed or forced through the plurality of barriers 22.

The temperature control section 17 is provided with a charge inlet pipe 25 which is affixed securely to the vessel 10 by means of a threaded bushing sleeve 26. The temperature control section 17 is further provided with a water or steam circulator 27 with inlet 28 and outlet 29 and regulating valves 43 and 44. This circulator thus provides cooling or heating of the temperature control section 17. The temperature control section 17 is further provided with a piston 30, preferably of hard steel. The piston 30 is provided with a piston ring 31, which prevents seepage of the charge rearwardly. A reduction gear box assembly 32 provides the means for operating the piston. While the conventional gear box may be used, the gear ratio should be sufficient to give around 1 stroke of the piston per second. This ratio, however, may be varied as desired depending on the type of charge used, size of barrier openings 23, number of barriers 22, etc. The gear box assembly 32 has a drive shaft 33 to which a connecting rod 34 is affixed, and the piston end is affixed by means of a wrist pin 35.

The temperature control section 17 is provided with a double cylinder wall 36, the inner sleeve 37 of which is replaceable. This sleeve is preferably of a somewhat softer steel than that of the piston 30. The temperature control section 17 is secured to the barrier section 16 by means of a plurality of tap screws 38, and are separated by a gasket 39 to prevent leakage.

While the vessel 10 and reduction gear box assembly 32 should be firmly secured to avoid vibration when in operation, Fig. 1 shows one method wherein the vessel 10 is positioned within a plurality of rounded metal brackets 40, which are affixed to a flat wood or metal base 41 by means of a plurality of bolts 42. The reduction gear box assembly may be secured to the base 41 for example by means of bolts 42.

In carrying out the method of this invention, pigment and vehicle are mixed together in the desired proportions in a mixing operation. Ordinarily the ingredients are placed in a usually symmetrical shaped steel vessel, open at the top and provided with a stirring device consisting of a vertical shaft to which are attached a series of blades. The purpose of the mixing operation is to distribute the ingredients into a uniform paste and to wet the pigments with the vehicle as thoroughly as possible. After the mixing operation is completed the charge is conveyed to the pigment dispersing machine illustrated in Figs. 1 and 2. As the piston 30 is drawn back, the piston 30 is drawn free of the charge inlet pipe 24 allowing the charge to enter the temperature control section 17. As the piston 30 begins its forward action, the piston 30 acts to shut off the opening of the charge inlet pipe 24 to prevent further charge from entering the temperature control section 17. The piston 30 on its forward action then applies pressure against the charge which entered the temperature control section 17 and acts as a force to cause the charge to be propelled towards the barriers 22 and to flow through the barrier openings 23. As the charge is forced through the barrier openings 23 additional pressure wetting of the pigment is accomplished and the pigment is thus dispersed in the vehicle. The charge as it is propelled or forced through the barriers 22 is withdrawn from the barrier section 16 by means of the charge outlet pipe 24. The charge may be reworked, if desired, or may be charged into additional dispersing machines. Depending upon the fineness of dispersion desired, the charge may be used directly, or, if desired, may be used as the charge for roller mill operations, or other grinding methods.

While my method has been illustrated with the apparatus described herein and shown in Figs. 1 and 2, it should be understood that my method is much broader than being limited to being carried out in this illustrated apparatus. Other methods of forcing the charge through the barrier 22 may be used, such as hydraulic pressure, air pressure, etc. as well as many other types of barriers.

The advantages of my method will be obvious to anyone skilled in the paint art as they are well aware of the time required by present methods to accomplish dispersion of the pigment in the vehicle.

Many apparently widely different embodiments of this invention may be made without departing from the principle, breadth and spirit thereof, and it is to be understood, therefore, that this invention is not limited to the specific embodiment thereof except as encompassed by the following claims.

I claim:

1. A method of dispersing pigment in the manufacture of paints comprising introducing a charge of vehicle and pigment into an impact zone, exerting a sudden horizontal pressure upon said charge, while restraining additional material from entering said zone, and forcing said charge through an initial dispersing media, allowing successive charges to enter said zone, repeating upon each successive charge the sudden pressure exerted upon the first-mentioned charge, forcing each successive charge through said initial dispersing media thereby displacing the preceding charge and causing said preceding charge to move through additional dispersing media.

2. A method of dispersing pigment in the manufacture of paints comprising introducing a charge of vehicle and pigment into an impact zone, exerting a sudden horizontal pressure upon said charge, while restraining additional material from entering said zone, and forcing said charge through an initial dispersing media, allowing successive charges to enter said zone, repeating upon each successive charge the sudden pressure exerted upon the first-mentioned charge, forcing each successive charge through said initial dispersing media thereby displacing the preceding charge and causing said preceding charge to move through additional dispersing media, each of said charges being more finely dispersed upon passing through each of said additional dispersing media.

3. An apparatus for dispersing pigments in the manufacture of paints comprising an elongated mixing vessel having a longitudinal passageway and a charge inlet and outlet, a plurality of rigid, transverse foraminous barriers interspaced throughout said passageway, and means for propelling a charge of pigmented material from the charge inlet through said foraminous barriers to the charge outlet, said means including a piston positioned within said mixing vessel and an automatic shutoff for said charge inlet effective upon the forward stroke of said piston.

ROBERT J. BROWN

REFERENCES CITED

The following references are of record in the file of this patent:

UNITED STATES PATENTS

| Number | Name | Date |
|---|---|---|
| 1,000,641 | Tebbit | Aug. 15, 1911 |
| 1,372,172 | Larsen | Mar. 22, 1921 |
| 1,961,229 | Ladretto et al. | June 5, 1934 |
| 2,084,156 | Marsden | June 15, 1937 |
| 2,125,245 | McCray | July 26, 1938 |
| 2,312,639 | Gronemeyer | Mar. 2, 1943 |
| 2,370,759 | Thompson | Mar. 6, 1945 |
| 2,425,912 | Appel et al. | Aug. 19, 1947 |